Jan. 8, 1952  E. L. McCORMICK  2,581,682
WEDGE SAWING MACHINE

Filed July 7, 1949  3 Sheets-Sheet 1

INVENTOR.
Elmer L. McCormick
BY
William D. Carothers
HIS ATTORNEY

Jan. 8, 1952     E. L. McCORMICK     2,581,682
WEDGE SAWING MACHINE
Filed July 7, 1949     3 Sheets-Sheet 2
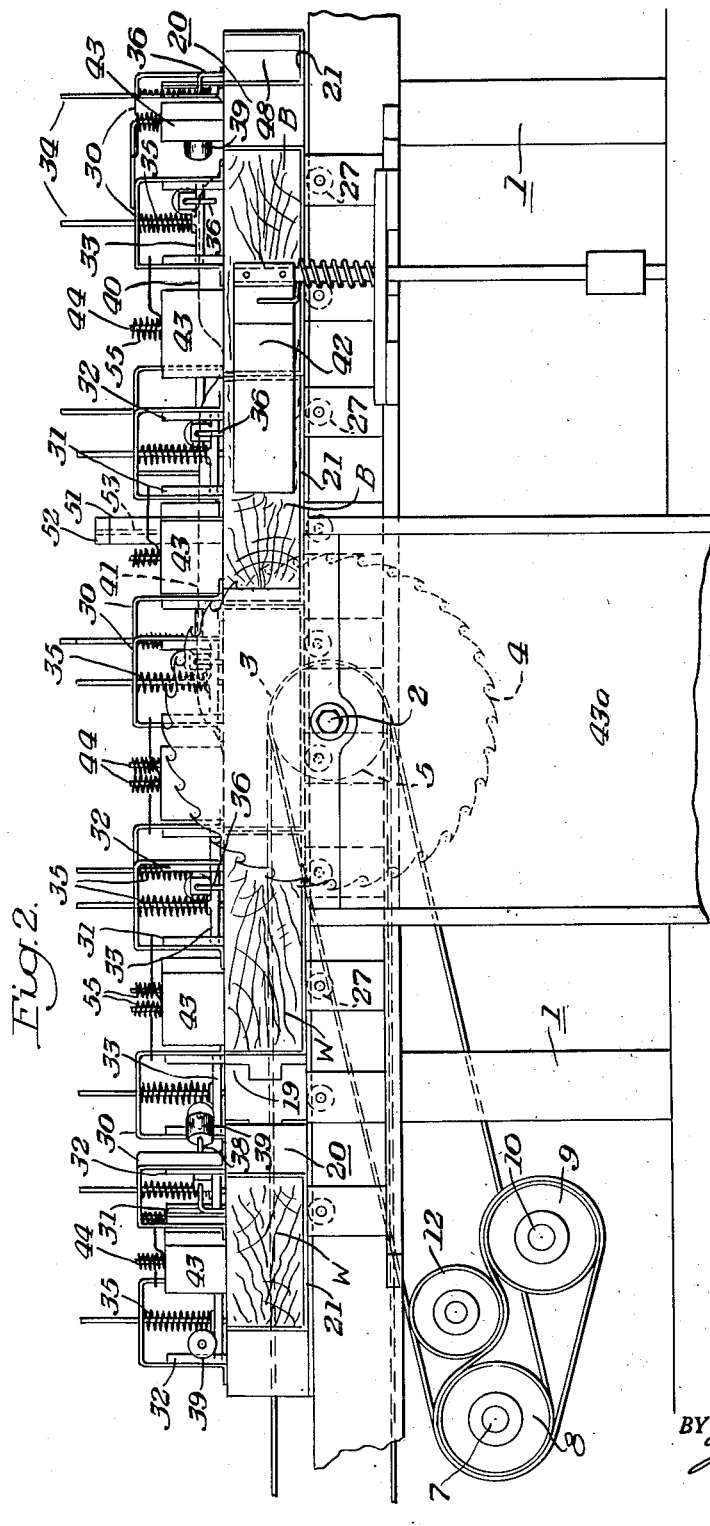
INVENTOR.
ELMER L. McCORMICK
BY
His Attorney Jan. 8, 1952 E. L. McCORMICK 2,581,682
WEDGE SAWING MACHINE
Filed July 7, 1949 3 Sheets-Sheet 3
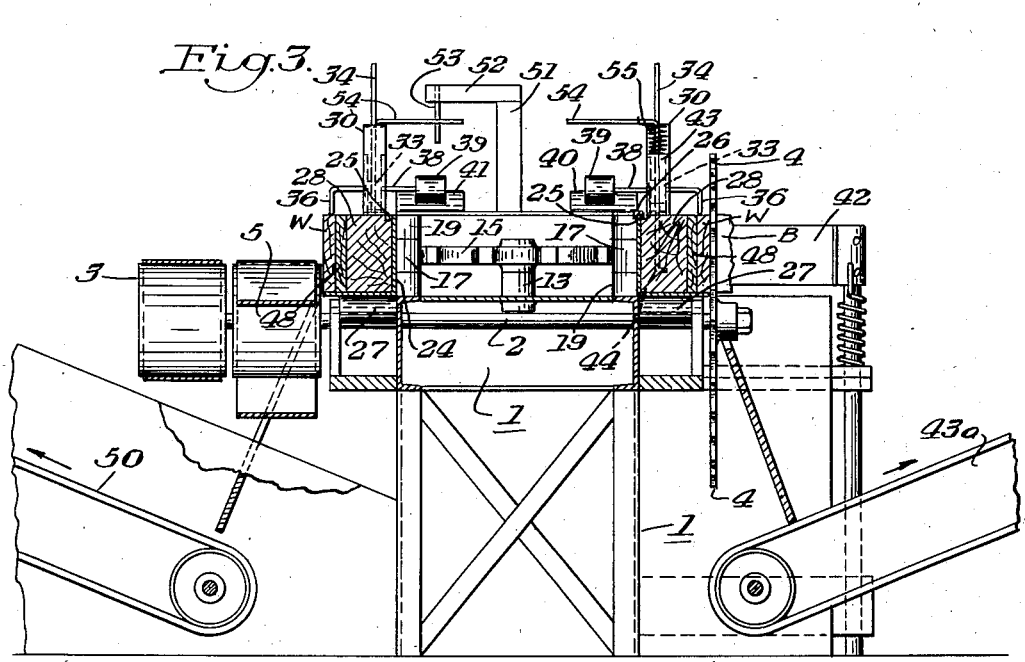
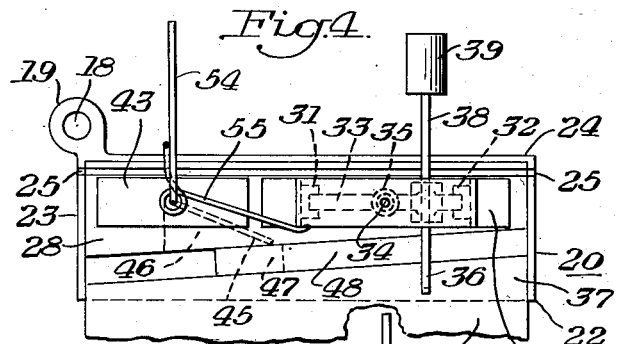
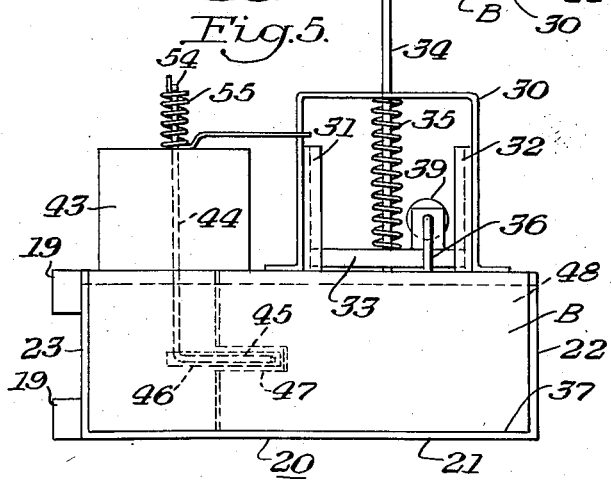
INVENTOR.
ELMER L. McCORMICK
BY
HIS ATTORNEY Patented Jan. 8, 1952

2,581,682

UNITED STATES PATENT OFFICE 2,581,682

WEDGE SAWING MACHINE

Elmer L. McCormick, Dunns Station, Pa.

Application July 7, 1949, Serial No. 103,331

4 Claims. (Cl. 143—10)

This invention relates generally to machines for sawing wood, and more particularly, to a machine for sawing wedges that are employed in mines and tunnels for wedging up-posts and beams in timbering and supporting the roof of the mine or tunnel.

Machinery for doing this character of work usually employs a swinging arbor saw and the workpiece must be positioned after the saw is retracted. It is necessary to provide a forward work producing stroke of the saw and then retract it before inserting and cutting the next workpiece. Such an operation wastes time in repositioning the swing and in ejecting the finished workpiece to replace it with another blank.

The principal object of this invention is the provision of a machine that, when supplied with a consecutive series of prepared blocks, automatically cuts them into sized blocks or wedges, ejecting first the scrap or piece from which the cut is made and thereafter ejecting the finished piece such as a block or wedge, which is transported to a bin or hopper for storage. A machine of this character eliminates time wasting hazard of manually feeding the blank and ejecting the finished piece in front of a swinging saw which is ever present in the former machines.

The machine comprising this invention is provided with a series of carriages each having an upwardly open seat upon which the block of wood is placed for cutting. This seat may be made rectangular for cutting rectangular blocks or the carriage seat may be provided with a wedge-shaped backup block for producing wedges. The size of the backup block may be varied to produce wedges of different thicknesses. The carriages are hingedly attached to an endless chain and are rigidly supported as they travel past a large circular saw to prevent any variation in the wedge being formed and to permit a close tolerance in relative moving parts of the machine.

This machine is also provided with a cam-operated dog or clamping finger which is automatically raised to permit the insertion of a block of wood on the upwardly open carriage seat which is formed by the bottom and end walls of the carriage. As the carriage passes from the loading position with a block of wood thereon the dog or clamping finger engages the block, holding it on the seat while the outer portion thereof is being sawed off. When the carriage reaches the discharge position in its circular movement about the machine the dog or finger is again automatically raised and the newly formed block or wedge is ejected to a conveyor.

Other objects and advantages appear hereinafter in the following descriptions and claims.

The accompanying drawings show, for the purpose of exemplification without limiting the invention or claims thereto, certain practical embodiments of the invention wherein:

Fig. 2 is a view in side elevation of the machine shown in Fig. 1;

Fig. 3 is a view in section taken on the line 3—3 of Fig. 1;

Fig. 4 is an enlarged detail top plan view of the carriage; and

Fig. 5 is a side elevation of the structure shown in Fig. 4.

Figure 1:
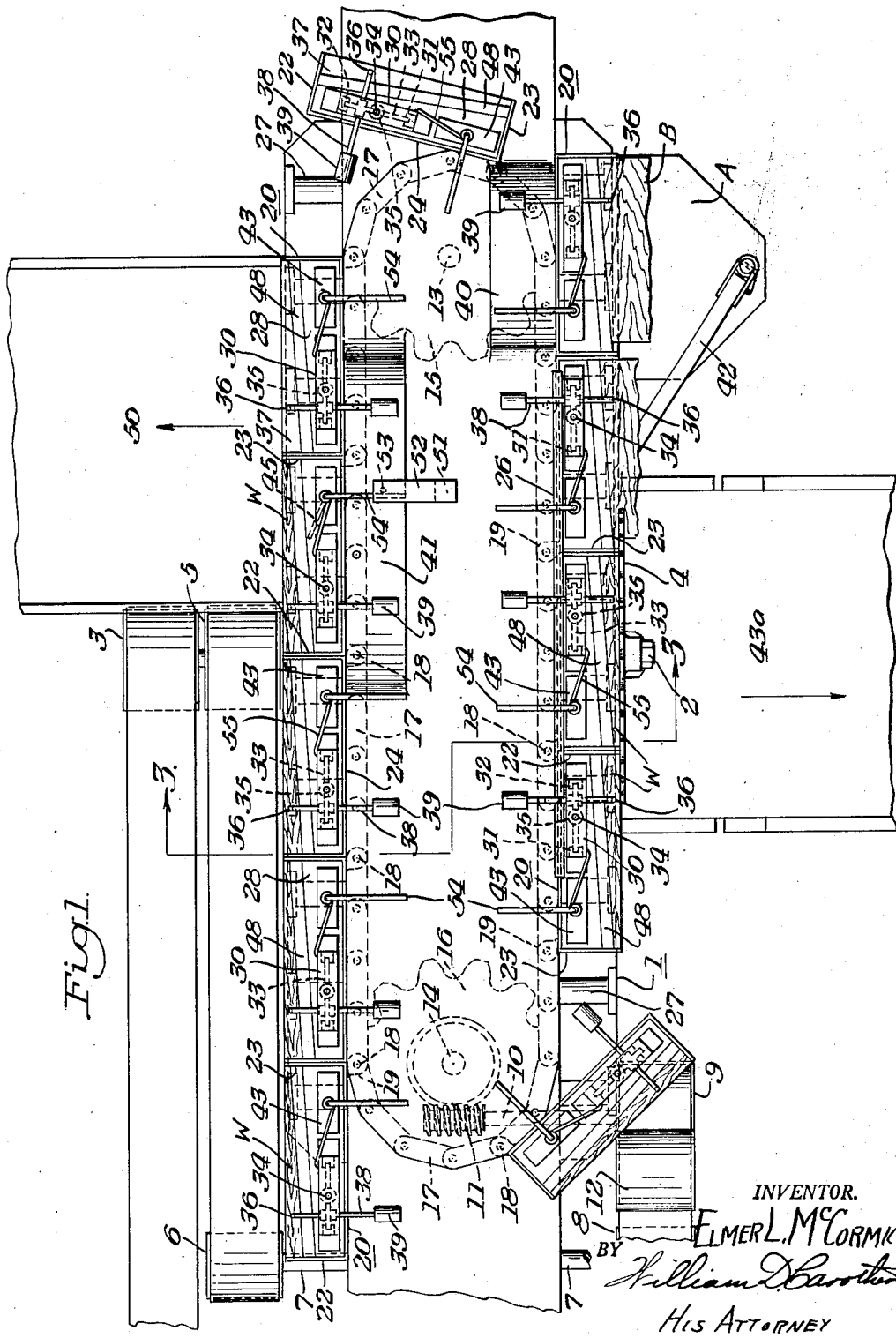
Fig. 1 is a top plan view of the block cutting machine.

Referring to Figs. 1, 2 and 3 of the drawings, the wedge making machine is supported on the bed 1 that extends the full length of the machine and has the transverse shaft 2 journaled therein. The pulley 3 on one end of the shaft is driven from a suitable source of power for operating the machine and the circular saw 4 on the other end of the shaft 2. Inwardly of the pulley 3, the shaft 2 is provided with the pulley 5, having a belt to drive the pulley 6 on the shaft 7 journaled on the bed. The other end of the shaft 7 has the pulley 8 which is connected through a belt to drive the pulley 9 on the shaft 10 which has the worm secured to the other end for driving a complementary worm gear as shown at 11 in Fig. 1. An idling takeup pulley 12 engages the belt between the pulleys 8 and 9 and its takeup movement is manually controlled to provide a clutch in the machine drive.

As shown in Fig. 2, the saw 4 is selected to be sufficiently large in diameter to cover the space of the whole of the wedge block carriage. The chord subtending the arc of the saw across the face of the block is substantially twenty-five degrees from the vertical and is disposed substantially the same degree as the resultant cutting forces of the saw and thus aids in maintaining the workpiece blocks on their seats.

The bed 1 is provided with spaced upstanding shafts 13 and 14 carrying the sprocket wheels 15 and 16, respectively, which engage the links of the endless chain 17. The chain 17 travels in a clockwise direction around these spaced sprocket wheels and past the saw 4 which is disposed substantially midway between the sprockets. The chain 17 is driven from the shaft 10 through the worm gear 11, the shaft 14 and sprocket 16, as shown in Figs. 1 and 2.

The pivot pin 18 in every fourth link of the chain 17 has the ears 19 hinged thereon which are formed integral with the upwardly open four-sided tray or carriage 20. These projecting ears are secured to the foremost end of each carriage 20 to permit it to be swung around the short radius of the sprocket gears 15 and 16. As shown in Figs. 4 and 5, the upwardly open carriage 20 has a bottom 21, the end walls 22 and 23 and the back wall 24. The end walls of this upwardly open four-sided carriage 20 are each notched out adjacent the rear wall, as indicated at 25 in Fig. 4, for the purpose of receiving the depending flange of the guide rail 26, as shown in Fig. 2, for steadying the top of the carriage as it passes the saw 4. The carriages are also supported by the spaced rollers 27 which cooperate with the guide channel 26 to maintain the carriages in fixed path as the saw blade 4 is cutting the blocks they carry. The carriages are thus prevented from swaying or becoming misaligned when passing the saw.

As shown in Figs. 3 and 4, each upwardly open tray or carriage is provided with a permanent block member 28, together with an upwardly extending bracket 30 having oppositely disposed inwardly projecting channel type rails 31 and 32 forming a guide way or track for receiving the ends of the crosshead 33. The crosshead 33 rides up and down in the guide rails 31 and 32 and carries therewith the vertical rod 34 which extends through a bearing in the bracket and on down in the block 28. When the crosshead is raised, it compresses the spring 35 against the upper portion of the bracket 30. The crosshead carries the clamping dog or finger 36 which operates within the dimensions of the carriage to engage and hold a workpiece block on the seat by the pressure of the spring 35.

As shown in Fig. 4, the workpiece block of wood B, from which the wedge block is to be cut, is cut to length and width and lies in the upwardly open socket or seat defined between the carriage ends 22 and 23 and the bottom 21. This socket or seat is indicated as 37 on the drawings. When the block of wood is placed on the seat 37 and the crosshead 33 is permitted to move downwardly, the finger 35 engages in the block and holds the same against movement. The crosshead 33 is provided with a rearwardly extending arm 38 having a roller 39 rotatably mounted thereon and arranged to engage the cam tracks 40 and 41. When the roller 39 engages either of the cam tracks 40 or 41, it lifts the crosshead 33, causing it to slide in the rails 31 and 32 of the bracket 30 and raise the finger 35 from engagement with the block.

When the carriage members 20 travel around the sawing machine with the chain 17, the rollers 39 engage the cam track 40 at the lower right hand corner, as shown in Fig. 1, to raise the dog or finger member 36 and permit the block of wood B to be inserted therein. This block extends outwardly of the seat on the carriage and, as the endless chain continues to move the carriage toward the saw, the roller 39 drops off the cam 40 and the dog 36 bites into the top of the block to maintain it in position. The dog 36 is aided by the pressure board 42 which applies pressure to the block to help hold it on the seat while it is being sawed. The dog 36 is adjusted so as to be closely adjacent the saw 4, but will not be engaged thereby. As the carriage 20 passes the saw 4, the outer overhanging portion of the block of wood will be cut off. Such waste part passes on the outer face of the saw. As soon as the saw cuts the outer part 42 free from the block B, the scrap piece 42 will fall on the conveyor 43a from whence it is carried upwardly to a stock pile. If the scrap piece is sufficiently large to be cut a second time, it is again conveyed to the machine so that it may be resawed. The wedge W that was cut is still held by the clamping finger 36 in the seat 37 of the carriage 20.

A shim or gauge block 48 is seated on the carriage for determining the size of the wedges to be cut. These shims may be made in different shapes and thicknesses for the purpose of functioning as a gauge to determine the shape and size of the wedge to be cut by the saw 4. In other words, if the shim 48 is made thick or heavy so that it occupies almost all the space of the triangularly shaped pocket 37, the wedge cut by the saw will of course be very thin and terminate in a sharp point. If, on the other hand, the shim or gauge block 48 is made very thin or omitted entirely so as to allow ample space on the seat 37, the wedge block cut by the saw 4 will of course be exceedingly large and may have a blunt end instead of a sharp point. It would be thicker and it may not be required to taper to a point as it otherwise must do if the gauge block 48 takes most of the space on the seat.

The block 28 also has an upwardly extending bearing block 43 that supports the vertical shaft 44, having an arm 45 at the bottom thereof arranged to be swung out through the slot 46 in the block 28 and through the slot 47 of the shim or gauge 48 as shown in Figs. 3 and 4. The arm 45 of the shaft 44 kicks the wedge off of the seat 47 when it is above the conveyor 50, as shown in Fig. 1. In order to swing the arm 45 in a clockwise direction, as viewed from Fig. 1, a post 51, having a cross arm 52 with a depending pin 53, is positioned in a line with the upper arm 54 attached to the shaft 44. The arm 54 engages the depending pin 53 when the carriage is passing the post, causing the shaft 44 to rotate in a clockwise direction, as viewed in Fig. 1, and thus swing the arm 45 out through the slots 46 and 47 to strike the wedge and knock it from the seat onto the conveyor 50. A spring 55, having one end locked on the arm 54 and the other end locked on the bracket 30, is provided for rotating the shaft 44 to retract the arm 45, as shown in Fig. 5. In order to permit the ejector arm 45 to function and knock the cut wedge from the seat 37 on the upwardly open carriage, the hold-down finger 36 must of course be raised from its clamping engagement with the wedge. This is accomplished by means of a cam track 41, as shown in Fig. 1, which is placed adjacent the conveyor 50. When each carriage is moved along the back of the machine, the rollers 39 ride up on the cam 41 and thus raise the crossheads and their wedge-locking finger 36 from the wedge members, leaving them free. At this time the arm 54 strikes the depending pin 53 and swings the arm 45 into engagement with the wedge, causing it to be knocked from its seat 37 and fall onto the conveyor 50, from whence the wedge is carried to a storage bin.

The length of the arm 54 on the ejector shaft 44, together with the relative position of the depending pin 53, determines the length of the arcuate path of the ejector arm 45. These factors are selected to insure that the arm 45 extends beyond the carriage when shoving the wedge off the seat. The crossarm 52 may be adjusted on the post 51 to locate the depending pin 53 at any selected position relative to the carriages 20 and the striker arm 54. When a thick gauge or shim 48 is placed on the carriage 20, it may be preferable to remove the pin 53 closer to the carriage 20 so that the striker arm 54 causes the lower ejector arm 45 to extend further through the slots 46 and 47 and thus be sure to knock the wedge from position when the clamping finger 36 has been raised.

The blocks of wood from which wedges are made are cut to length and width and are then fed to the loading station A. When the machine is operating the blocks of wood are placed on the seats 37 by hand as the carriages pass the loading station A and the cam 40 maintains the clamping fingers 36 in their raised position. After the block has been properly placed on each seat 37 presented, the operator prepares himself by picking up another block in readiness for placing the same on the seat of the next consecutive carriage 20. As the chain proceeds the dogs clamp the blocks of wood in place and the carriage carries the block of wood into the rotary saw 4, causing the same to cut off the outer slab 42 which drops to the conveyor 43ª and is taken to a place where it may be sorted. If the discarded piece of material is sufficiently thick to make another wedge, it may be repeatedly delivered to station A for the purpose of recutting the same until there is insufficient material to take any more wedge cuts therefrom. Owing to the fact that the filler block 28 has an angularly disposed face and the faces forming a part of the carriage slot of the gauge block 48 are parallel, the angle of the face on the filler block 28 determined the angle of the wedge as the saw 4 always cuts a true parallel edge relative to the carriage. If the shim 48 is made wedge-shaped, then the block formed would be rectangular.

This machine may be operated by one person who continuously feeds a block of wood to each carriage as it is presented to the station A. The machine then cuts off the waste material and automatically ejects the preformed wedge. The scrap and wedge are then removed from the vicinity of the machine by conveyors.

I claim:

1. In a machine for sawing blocks, the combination of an endless chain mounted for traveling in a horizontal plane along a front and back flight, a series of work holding carriages having bottom, back and end walls and pivotally attached to said chain to move therewith, track guide means along the front flight of said chain to engage and steady the carriages as they travel therealong, an upwardly and outwardly open workpiece seat formed by the bottom, end and back walls on each carriage, dog means mounted on each carriage above its seat and biased to retain workpieces on said seats, a saw mounted adjacent said front flight to cut the workpieces as they pass on said carriages, and cam means adjacent the traveling chain along the back flight to retract said dog means and release the cut workpiece.

2. In a machine for sawing blocks, the combination of an endless chain supported to travel in a horizontal circuit having straight front and back sections, work holding carriages having bottom, back and end walls and of considerably greater length than the links of the chain and pivotally attached to said chain to move therewith, a workpiece seat formed by the bottom, end and back walls on each carriage, a workpiece clamp and ejector carried by each carriage to hold and discharge the workpiece from said seat, and trip means cooperating with the movement of said chain to retract said clamp and actuate the ejector on each carriage as they travel along the back section.

3. In a machine for sawing blocks, the combination of an endless chain supported for travel in a horizontal plane and traveling along front and back flights, work holding carriages having bottom, back and end walls and pivotally attached to said chain to travel therewith, support means for assuming the weight of said carriages as they travel with the chain, track guide means cooperating with said support means to hold the carriages on a true course as they travel along the front flight of the chain, a workpiece seat formed by the bottom, end and back walls on each carriage, clamp means mounted on each carriage above its seat to hold the workpiece on the carriage seat, a saw mounted to cut the workpiece as it is conveyed therepast by the carriage, and retracting cam means adjacent the traveling chain for opening said clamp means to remove and insert workpieces on said seats.

4. A work holding carriage for use on a block sawing machine comprising an upwardly open box having bottom, back and end walls secured together along their adjacent edges, a filler block secured in said box along the back wall but spaced from the front edge to provide a workpiece seat on the bottom and end walls, a gauge block occupying a part of said seat and leaving a wedge-shaped portion for the workpiece, and clamp means carried by the carriage above said seat for holding a workpiece on said wedge-shaped portion.

ELMER L. McCORMICK.

REFERENCES CITED

The following references are of record in the file of this patent:

UNITED STATES PATENTS

| Number | Name | Date |
|---|---|---|
| 226,569 | Temple | Apr. 13, 1880 |
| 850,519 | Busch | Apr. 16, 1907 |
| 1,344,860 | Cable | June 29, 1920 |
| 1,863,303 | Goad | June 14, 1932 |
| 1,956,874 | Ninegar | May 1, 1934 |
| 2,025,474 | Quigg | Dec. 24, 1935 |